(12) United States Patent
Princinsky et al.

(10) Patent No.: US 6,888,709 B2
(45) Date of Patent: May 3, 2005

(54) ELECTROMAGNETIC TRANSIENT VOLTAGE SURGE SUPPRESSION SYSTEM

(75) Inventors: Daniel Princinsky, Saginaw, MI (US); Sandra Hinton, Reese, MI (US)

(73) Assignee: Applied Energy LLC, Saginaw, MI (US)

( * ) Notice: Subject to any disclaimer, the term of this patent is extended or adjusted under 35 U.S.C. 154(b) by 37 days.

(21) Appl. No.: 10/357,107

(22) Filed: Feb. 3, 2003

(65) Prior Publication Data

US 2003/0206391 A1 Nov. 6, 2003

Related U.S. Application Data

(60) Provisional application No. 60/377,831, filed on May 3, 2002.

(51) Int. Cl.[7] .............................. H02H 7/26
(52) U.S. Cl. ........................ 361/47; 361/107; 361/42
(58) Field of Search ............................. 361/33, 42, 47, 361/49, 50, 91, 92, 107; 340/527, 650

(56) References Cited

U.S. PATENT DOCUMENTS 3,764,855 A * 10/1973 Beachley ..................... 361/47
4,200,836 A * 4/1980 Okada et al. ............... 324/509

OTHER PUBLICATIONS

Characteristics of Different Power Systems Neutral Grounding Techniques: Fact & Fiction, D.D. Shipp, Westinghouse Electric Corp., Pittsburgh, PA and F.J. Angelini, Westinghouse Electric Corp., Philadelphia, PA, no date.

Resistive Grounding Techniques, Martin Glover, Post Glover Resistors, Incorporated, Erlanger, KY, no date.

* cited by examiner

*Primary Examiner*—Rajnikant B. Patel
(74) *Attorney, Agent, or Firm*—Baker Botts L.L.P.

(57) ABSTRACT

Three single-phase transformers are provided, the primary sides connected in a Wye configuration. One terminal on the primary side of each transformer is coupled to a reference node and the other terminal on the primary side of each transformer is coupled to one phase of the power supply bus. The secondary sides of the transformers are connected in a delta configuration through a resistor. The circuit connecting the secondary sides of the transformers is not electrically connected to ground.

5 Claims, 1 Drawing Sheet

ELECTROMAGNETIC TRANSIENT VOLTAGE SURGE SUPPRESSION SYSTEM

RELATED APPLICATION

This application claims priority from U.S. provisional application No. 60/377,831, entitled "Electromagnetic transient voltage surge suppression system," filed on May 3, 2002, which is incorporated by reference herein.

BACKGROUND OF THE INVENTION

In industrial settings such as plants, factories, or other large-scale systems that utilize three-phase power, there can be numerous problems caused by voltage transients present in one of the three-phase circuits. These transients may be caused by switching occurring at an upstream power-station, arcing ground faults, lightning strikes, or numerous other events. Such transients can severely damage or destroy equipment connected to the effected three-phase circuit, or, when the system employs circuit interrupters, can cause those interrupters to open the circuit, resulting in power outages throughout the plant. Such outages have negative economic effects since productive equipment remains non-functional until the circuit is re-energized. Moreover, in settings where uninterrupted power is critical for safety or other reasons, such as on ocean-going vessels where control surfaces must remain powered to navigate the vessel, such outages are not acceptable.

Transient voltage surge suppression has been in use for over thirty-five (35) years. However, the prior art systems have several shortcomings. Metal oxide varistors (MOVs) and silicon avalanche diodes (SADs) clamp voltage surges only after the voltage is double that normally present in the circuit or more. Such a system causes stress on devices connected to the circuit and may damage or cause permanent failure of the components. Additionally, the solid state components used in the prior art systems are degraded by the transient events that the circuit is designed to protect against.

SUMMARY OF THE INVENTION

The present invention is an apparatus for suppressing transient voltage surges. Voltage transients are overcome by the present invention which, in one exemplary embodiment, employs three single-phase transformers and a resistor to form a voltage suppression circuit.

One exemplary embodiment of the invention includes three single-phase transformers, each of which has a primary side and secondary side. One terminal on the primary side of each of these single-phase transformers is connected to a single-phase power supply bus through a fused disconnect. A first terminal on the secondary side of the first phase transformer is connected to a first terminal on the secondary side of the second transformer through a resistor. The second terminal on the secondary side of the first transformer is connected to a first terminal on the secondary side of a third transformer. The second terminal on the secondary side of the third transformer is connected to the second terminal on the secondary side of the second transformer. In this fashion, the secondary sides of each of the single-phase transformers are connected in series through a resistor.

BRIEF DESCRIPTION OF THE DRAWING

For a more complete understanding of the present invention, reference is made to the following detailed description of exemplary embodiments with reference to the accompanying drawing in which.

DETAILED DESCRIPTION OF THE EXEMPLARY EMBODIMENT

Figure 1:
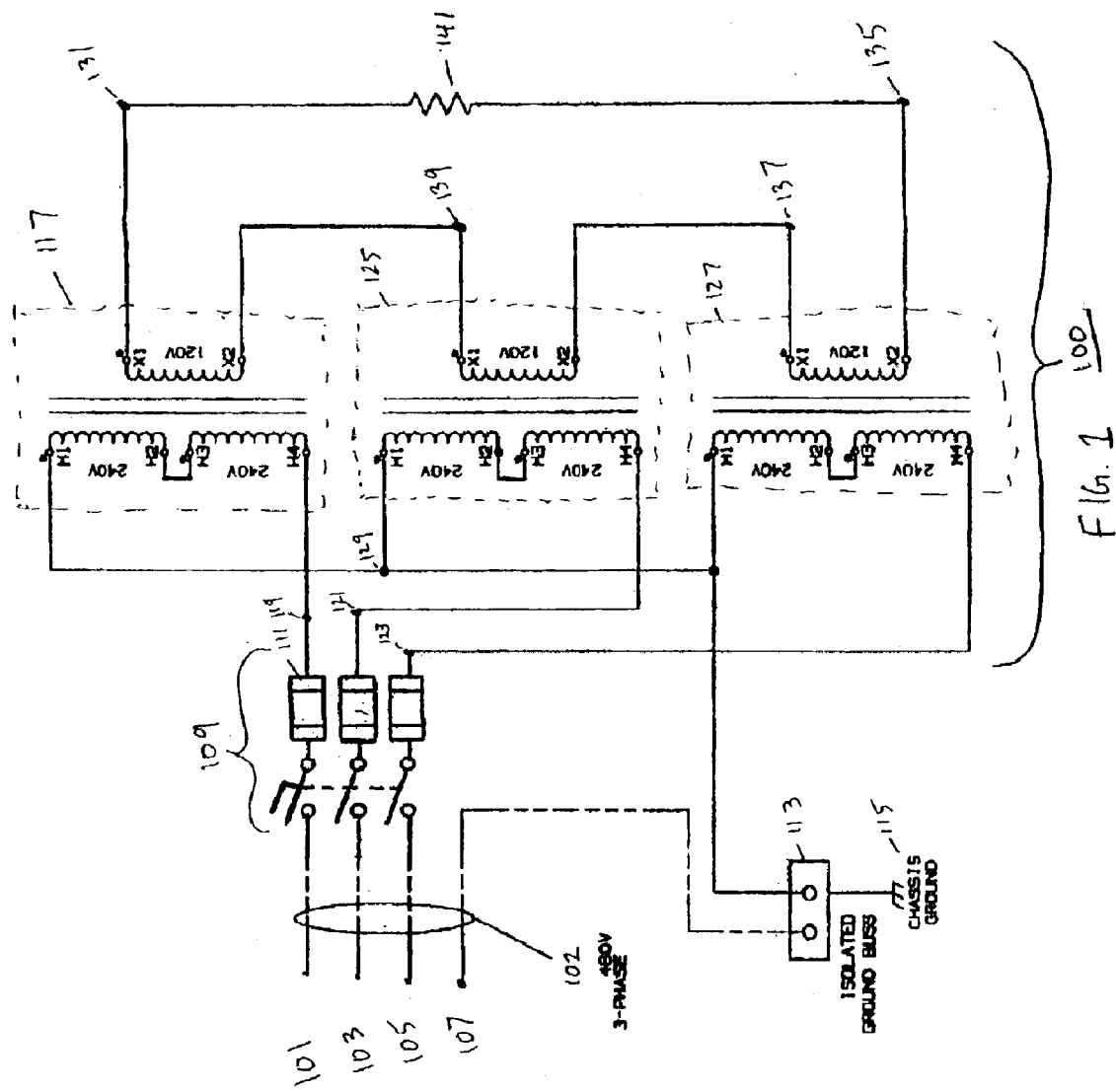
FIG. 1 is a schematic diagram illustrating an overview of one embodiment of the present invention.

FIG. 1 illustrates a conceptual overview of the overall architecture of the present invention. As illustrated, three single-phase transformers, 117, 125, 127 and a resistor are connected to form a voltage suppression circuit 100.

Each of the three single-phase transformers has a respective first terminal 119, 121, 123, that is connected to a respective single-phase power supply 101, 103, 105, on the power-supply bus 102 through a fused disconnect 109. Each of the respective second terminals on the primary side 129 of the single-phase transformers are connected together and connected to an isolated ground bus 113, which is connected to the conductive chassis 115 housing the voltage suppression circuit. In a preferred embodiment, a ground wire 107, if present on the power-supply bus 102 is also connected to an isolated ground bus 113, such as by a ground mat.

A first terminal 131 on the secondary side of one on the single-phase transformers 117 is connected to a first terminal 135 on the secondary side of a second of the single-phase transformers 127 through resistor 141. The second terminal 137 on the secondary side of the second of the single-phase transformers 127 is connected to a first terminal on the secondary side of a third of the single-phase transformers 125. The first terminal 139 on the secondary side of the third of the single-phase transformers 125 is connected to the second terminal on the secondary side of the first single phase transformers 117. In this fashion, the secondary sides of each of the single-phase transformers, 117, 125, 127 is connected in series through resistor 141.

The circuit 100 operates as a surge and fault protector for any equipment on the power bus 102, against a voltage surges or faults on any of the three phases. The circuit 100 operates as a three-phase pull down resistor whenever a transient occurs. A transient on any phase creates an unbalance on the primary side of its respective single-phase transformer 117, 125, 127, causing the current to flow through the secondary side of the transformer and through resistor 141 which functions to dissipate any excess energy induced by the voltage transient. At this time, feedback from the secondary side of the transformer to the primary side of the transformer will pull the voltage level on the effected line back to its normal voltage. During a fault, the secondary to primary feedback will cause the voltage to rise on the faulted primary phase, conversely, during a transient, the voltage will drop on the effected primary phase.

The transformer windings, size of the resistor 141, and fuse current ratings of the fused disconnect 109 can all be adjusted to ensure that the suppression circuit is suited for its environment. In one exemplary embodiment, the single phase transformers 117, 125, 127, in FIG. 1 employ a winding ratio of 4:1, but other winding ratios maybe employed if appropriate. Furthermore, FIG. 1 employs #10AWG rated wiring for 600V, each fuse in the fused disconnect 109 is rated for 5 Amperes and the resistor 141 is rated for approximately 22 Ohms at nominal operating temperature. Selection of transformers, winding ratios, and resistor values depend on the system the circuit is intended to protect. Details of an exemplary design methodology are now provided.

480 volt distribution systems powered by a 2000 to 3000KVA ungrounded delta power transformer that feeds approximately 1000 ft of bus duct, generally have about 1 to 3 Amperes of charge current. Our experience has proven this to generally be just over 2 Amperes by actual amperage readings in the field. The variations are due to the lengths of the feeder cable and bus duct as well as the number and size of the electric motors and power factor correction capacitors operating at any given time. Typically, resistance grounding circuits constantly bleed this charge to ground to help prevent grounding problems. The present invention does not bleed this energy to ground, it uses this charge energy to help stabilize and balance the phase voltages to ground.

The present invention is a power filter that acts like a three-phase transformer when all phases are balanced. Should there be a phase voltage imbalance, the unit acts like a pull down resistor to the phases that are trying to have a rise in voltage and it acts like a pull up resistor to the phase that is trying to be pulled low.

The present invention makes use of a zero sequence circuit that uses virtually no power when the phase voltages are balanced. When the phase voltages are balanced each single phase primary has about 277 volts (480/1.732) across it, which reflects about 69 volts across each single phase secondary. As noise or insulation breakdown from anywhere on the distribution system fed from the power transformer starts to cause an imbalance in phase voltages with respect to ground, the secondary voltages are no longer equal. This causes secondary currents to circulate through the grid resistor 141 and the energy from the imbalance is limited and dissipated by the grid resistor 141.

The resistor 141 is chosen to limit the current to maximum current for the transformer design. Assuming a maximum primary imbalance of: 0 v, 480 v, 480 v, on the three phases, secondary voltages of about: 0 v, 120 v, 120 v would be expected. The voltage across the grid resistor 141 will therefore be about 208 v (120×1.732). To handle this condition, and to handle about 2 Amperes of charge current during maximum imbalance (being mindful that single phase transformers are utilized in the exemplary embodiment), the primary of 480 volts×2.3 Amperes=1,104 VA. The transformers selected for this unit are each 1 KVA, with a turns ratio of 4 to 1, a voltage ratio of 4 to 1 and a current ratio of 1 to 4. The secondary current will be a maximum of 9.2 Amperes (2.3×4). The resistance of the grid resistor is about 22.1 Ohms. The power that the resistor 141 must handle is about 1,913 watts [(120×1.732)×9.2] (times 2 for continuous duty). The resistor 141 has a positive temperature coefficient so the circuit is self protecting.

It will be understood to one of ordinary skill in the art that modifications, additions and substitutions could be made to the described exemplary embodiments without departing from the scope or spirit of the invention, which is defined in the appended claims. For example, a cooling fan could be placed in parallel with resistor 141 to dissipate heat produced during the operation of the circuit. Further, it may be possible to utilize a single three-phase transformer in place of the three single-phase transformers, if a suitable transformer core could be found to avoid electro-magnetic coupling between the three phases.

We claim:

1. A an apparatus for suppressing transient voltage surges in a three-phase power supply bus, said power supply bus comprising at least a first, second and third power line, each power line corresponding to a respective phase of the three-phase power supply bus, comprising:
   a) a reference node;
   b) an interface having an input side and an output side, said input side coupled to at least said first, second and third power lines and said output side of said interface having a first, second and third output nodes;
   c) a first transformer having a primary side and a secondary side, said primary side having a first primary terminal and a second primary terminal, said first primary terminal coupled to said first output node of said interface and said second primary terminal coupled to said reference node, said secondary side of said first transformer having a first secondary terminal and a second secondary terminal;
   d) a second transformer having a primary side and a secondary side, said primary side having a third primary terminal and a fourth primary terminal, said third primary terminal coupled to said second output node of said interface and said fourth primary terminal coupled to said reference node, said secondary side of said second transformer having a third secondary terminal and a fourth secondary terminal, said fourth secondary terminal coupled to said first secondary terminal;
   e) a third transformer having a primary side and a secondary side, said primary side having a fifth primary terminal and a sixth primary terminal, said fifth primary terminal coupled to said third output node of said interface and said sixth primary terminal coupled to said reference node, said secondary side of said third transformer having a fifth secondary terminal and a sixth secondary terminal, said sixth secondary terminal coupled to said third secondary terminal;
   f) a resistor, coupled between said second secondary terminal and said fifth secondary terminal;
   wherein the circuit formed by said resistor and said secondary sides of said first, second and third transformers is not electrically connected to said reference node.

2. The apparatus of claim 1, wherein the resistor is rated for approximately 22 Ohms at normal operating temperature.

3. The apparatus of claim 1, wherein the circuit has a cooling device in place, such as a fan to assist in dissipating the heat produced during operation of the circuit.

4. The apparatus of claim 1, wherein the winding ratio of each single phase transformer is approximately four (4) to one (1).

5. A an apparatus for suppressing transient voltage surges in a three-phase power supply bus, said power supply bus comprising at least a first, second and third power line, each power line corresponding to a respective phase of the three-phase power supply bus, comprising:
   a) a reference node;
   b) a means for interfacing said first, second and third power lines;
   c) a first transformer having a primary side and a secondary side, said primary side having a first primary terminal and a second primary terminal, said first primary terminal coupled to said interface means and said second primary terminal coupled to said reference node, said secondary side of said first transformer having a first secondary terminal and a second secondary terminal;
   d) a second transformer having a primary side and a secondary side, said primary side having a third primary terminal and a fourth primary terminal, said third primary terminal coupled to said interface means and said fourth primary terminal coupled to said reference node, said secondary side of said second transformer having a third secondary terminal and a fourth secondary terminal, said fourth secondary terminal coupled to said first secondary terminal;

e) a third transformer having a primary side and a secondary side, said primary side having a fifth primary terminal and a sixth primary terminal, said fifth primary terminal coupled to said interface means and said sixth primary terminal coupled to said reference node, said secondary side of said third transformer having a fifth secondary terminal and a sixth secondary terminal, said sixth secondary terminal coupled to said third secondary terminal; and f) a means for dissipating power, coupled between said second secondary terminal and said fifth secondary terminal;

wherein the circuit formed by said means for dissipating power and said secondary sides of said first, second and third transformers is not electrically connected to said reference node.

* * * * *